(12) United States Patent
Basso et al.

(10) Patent No.: US 9,306,848 B2
(45) Date of Patent: *Apr. 5, 2016

(54) USING SPECIAL-CASE HARDWARE UNITS FOR FACILITATING ACCESS CONTROL LISTS ON A NETWORKING ELEMENT

(71) Applicant: International Business Machines Corporation, Armonk, NY (US)

(72) Inventors: Claude Basso, Nice (FR); Natarajan Vaidhyanathan, Carrboro, NC (US); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 548 days.

This patent is subject to a terminal disclaimer.

(21) Appl. No.: 13/769,437

(22) Filed: Feb. 18, 2013

(65) Prior Publication Data

US 2014/0082122 A1     Mar. 20, 2014

Related U.S. Application Data

(63) Continuation of application No. 13/616,201, filed on Sep. 14, 2012.

(51) Int. Cl.

| | |
|---|---|
| *G06F 15/173* | (2006.01) |
| *H04L 12/743* | (2013.01) |
| *G06F 15/167* | (2006.01) |
| *G06F 17/30* | (2006.01) |
| *H04L 29/06* | (2006.01) |
| *H04L 12/28* | (2006.01) |
| *G06F 13/00* | (2006.01) |

(52) U.S. Cl.
CPC .......... *H04L 45/7457* (2013.01); *G06F 15/167* (2013.01); *G06F 17/30982* (2013.01); *H04L 63/101* (2013.01)

(58) Field of Classification Search
CPC . H04L 45/7457; H04L 63/101; G06F 15/167; G06F 17/30982
See application file for complete search history.

(56) References Cited

U.S. PATENT DOCUMENTS

| | | | |
|---|---|---|---|
| 6,754,662 | B1 | 6/2004 | Li |
| 7,324,514 | B1 | 1/2008 | Haq et al. |
| 7,389,377 | B2 | 6/2008 | Gupta |

(Continued)

OTHER PUBLICATIONS

U.S. Appl. No. 13/616,201, entitled Using Special-Case Hardware Units for Facilitating Access Control Lists on a Networking Element, filed Sep. 14, 2012.

*Primary Examiner* — Wen-Tai Lin
(74) *Attorney, Agent, or Firm* — Patterson & Sheridan, LLP (57) ABSTRACT

Access control lists (ACLs) include one or more rules that each define a condition and one or more actions to be performed if the condition is satisfied. In one embodiment, the conditions are stored on a ternary content-addressable memory (TCAM), which receives a portion of network traffic, such as a frame header, and compares different portions of the header to entries in the TCAM. If the frame header satisfies the condition, the TCAM reports the match to other elements in the ACL. For certain conditions, the TCAM may divide the condition into a plurality of sub-conditions which are each stored in a row of the TCAM. To efficiently use the limited space in TCAM, the networking element may include one or more comparator units which check for special-case conditions. The comparator units may be used in lieu of the TCAM to determine whether the condition is satisfied.

8 Claims, 6 Drawing Sheets

(56) References Cited

U.S. PATENT DOCUMENTS

| | | |
|---|---|---|
| 7,480,299 B2 | 1/2009 | O'Keeffe et al. |
| 7,602,787 B2 | 10/2009 | Cheriton |
| 7,738,454 B1 | 6/2010 | Panwar et al. |
| 7,953,088 B2 | 5/2011 | Cheriton et al. |
| 7,961,734 B2 | 6/2011 | Panwar et al. |
| 7,995,579 B2 | 8/2011 | Shiraki |
| 2004/0170171 A1 | 9/2004 | Kanekar et al. |
| 2013/0268729 A1 | 10/2013 | Manhas et al. |

| DETERMINING IF TCP SP > 1023 | | ~300 |
|---|---|---|
| 16 BIT BINARY REPRESENTATION OF 1023 | 0000 0011 1111 1111 | |

305

| | CONDITION | PATTERN + MASK IN TCAM 105 |
|---|---|---|
| RULE 1 | TCP SP > 32768 | 1XXX XXXX XXXX XXXX |
| RULE 2 | TCP SP > 16384 | X1XX XXXX XXXX XXXX |
| RULE 3 | TCP SP > 8192 | XX1X XXXX XXXX XXXX |
| RULE 4 | TCP SP > 4096 | XXX1 XXXX XXXX XXXX |
| RULE 5 | TCP SP > 2048 | XXXX 1XXX XXXX XXXX |
| RULE 5 | TCP SP > 1024 | XXXX X1XX XXXX XXXX |

FIG. 3

| ←3 BITS→ | ←16 BITS→ | ←16 BITS→ | ←2 BITS→ |
|---|---|---|---|
| ENCODE | VALUE1 | VALUE2 | OPERATION |

| FIELD | LENGTH | DESCRIPTION |
|---|---|---|
| ENCODE | 3 BITS | 000-SOURCE PORT<br>001-DESTINATION PORT<br>010-VLAN ID<br>011-TTL<br>100-L3 PROTOCOL<br>101-ETHER TYPE<br>110-L3 PAY LOAD LENGTH<br>111-UNASSIGNED |
| VALUE1 | 16 BITS | SET BASED ON CONDITION |
| VALUE2 | 16 BITS | SET BASED ON CONDITION |
| OPERATION | 2 BITS | 00-COMPARISON: VALUE1 ≤ X ≤ VALUE2<br>01-COMPARISON: (VALUE1==X) OR (VALUE2==X)<br>10-COMPARISON: (VALUE1!=X) AND (VALUE2!=X)<br>11-UNASSIGNED |

USING SPECIAL-CASE HARDWARE UNITS FOR FACILITATING ACCESS CONTROL LISTS ON A NETWORKING ELEMENT

CROSS-REFERENCE TO RELATED APPLICATIONS

This application is a continuation of co-pending U.S. patent application Ser. No. 13/616,201, filed Sep. 14, 2012. The aforementioned related patent application is herein incorporated by reference in its entirety.

BACKGROUND

Computer systems often include multiple computers and/or servers configured to communicate over a network. In Ethernet networks, for example, packets of data are sent from computer to computer according to one or more communication protocols, such as Transmission Control Protocol (TCP) and Internet Protocol (IP). Each computer in the network may include a host Ethernet adapter configured to facilitate communications that terminate at an operating system (OS) running on the respective computer. The operating system running on each computer may include a device driver configured to interact with the host Ethernet adapter of the respective computer.

SUMMARY

Embodiments herein disclose a method using access control lists. The method includes evaluating a portion of received network traffic using a comparator unit of a networking element, the comparator unit comprising one or more hardware units for determining whether the network traffic portion satisfies a condition associated with an access control list (ACL). The method further includes transmitting a result of evaluating the network traffic portion using the comparator unit to a content addressable memory (CAM). Upon determining that the result satisfies an entry in the CAM, the method selects one or more actions corresponding to the satisfied entry to be performed by the networking element, wherein the one or more actions are part of the ACL.

Another embodiment disclosed herein describes a networking element that includes a processor and a comparator unit. The comparator unit is configured to evaluate a portion of received network traffic using a comparator unit of a networking element, the comparator unit comprising one or more hardware units for determining whether the network traffic portion satisfies a condition associated with an ACL. The network element also includes a CAM configured to receive a result of evaluating the network traffic portion from the comparator unit and, upon determining that the result satisfies an entry in the CAM, select one or more actions corresponding to the satisfied entry to be performed by the processor, wherein the one or more actions are part of the ACL.

Another embodiment disclosed herein describes a computer program product that compares network traffic to ACLs. The program product including computer-readable program code configured to evaluate a portion of received network traffic using a comparator unit of a networking element, the comparator unit comprising one or more hardware units for determining whether the network traffic portion satisfies a condition associated with an ACL. The program product including computer-readable program code configured to transmit a result of evaluating the network traffic portion using the comparator unit to a CAM. Upon determining that the result satisfies an entry in the CAM, the program product including computer-readable program code configured to select one or more actions corresponding to the satisfied entry to be performed by the networking element, wherein the one or more actions are part of the ACL.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Network devices may be configured to manage or control inbound and outbound traffic flow based on one or more predefined conditions. The predefined conditions may be represented in the form of an access control list (ACL) specifying actions to be performed by a network device when the predefined conditions are met. The ACL compares a portion of network traffic—e.g., a frame header—to one or more of the conditions. If a condition is satisfied, the ACL instructs the network device to perform a corresponding action. The actions are not limited to any particular network optimization technique. For instance, the actions may apply to network security, quality of service, prioritization, power conservation, and the like.

As such, ACLs permit network administrators to manage network traffic flowing through a networking element to optimize network security, performance, quality of service (QoS), and the like. For example, the networking element may be an integrated circuit (IC) located within a larger network device—e.g., a router, switch, bridge, etc. Furthermore, the ACLs may be used in endpoints in a network such as servers of user computing devices. Moreover, a single network element may use multiple stored ACLs to manage traffic flows. This enables different ACLs to be customized for different optimization tasks (e.g., network performance versus network security). The networking element compares the incoming frames of the network traffic to the ACLs which specify one or more actions to be performed by the networking element. Stated differently, multiple ACLs may be independently maintained within a single networking element in order to achieve different network optimizations.

In one embodiment, for certain conditions, such as testing whether a received number falls within a certain numerical range, the TCAM may divide the condition into a plurality of sub-conditions which are each stored in a respective row of the TCAM. As conditions become more complex, more rows of the TCAM are needed. To efficiently use the limited space in the TCAM, the networking element may include one or more comparator units which check for special-case conditions. The comparator units may be used in lieu of the TCAM to determine whether the condition is satisfied. Thus, instead of directly determining whether the received data satisfies the condition, the TCAM monitors the output of the comparator units. In one embodiment, by using the comparator units, the TCAM needs only one entry to monitor the output of the comparator units instead of using multiple rows to evaluate the received data.

In some embodiments, a system administrator may configure the different comparator units to check for different conditions. For example, one comparator unit may check to see if a TCP source port is greater than 1023 while another comparator unit determines if the received frame is associated with a UDP packet. In one embodiment, the networking element includes a register that is accessible by the system administrator and that stores instructions for configuring the comparator units to perform different functions. The administrator may access the register to add, change, or remove the different instructions, thereby changing the functions of the comparator units associated with the entries in the register.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
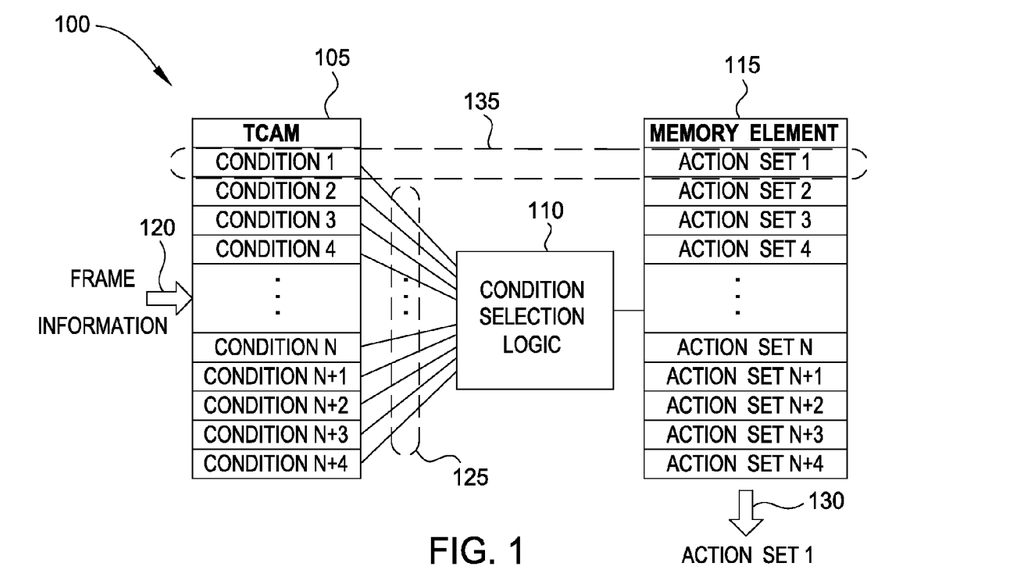
FIG. 1 illustrates hardware elements of a memory system for managing multiple ACLs in a networking element, according to one embodiment described herein.

FIG. 1 illustrates hardware elements of a memory system 100 for managing multiple ACLs in a networking element, according to one embodiment described herein. Each ACL includes one or more rules. As used herein, a rule includes a condition and a corresponding action that is performed if the condition is satisfied. For example, the ACL may include a condition that if the TCP source port is greater than 1023 (i.e., the condition) then the packet should be discarded (i.e., the action). Accordingly, the action is performed only if the condition is true.

In one embodiment, ACLs may have more than one rule (i.e., more than one condition and action pair), and thus, may properly be referred to as rule groups. For example, the system administrator may want to forward a copy of a received frame if the IP source address is 9.*.*.* (where * indicates a wildcard) to a different networking element than the destination networking element (Rule 1) but drop the packet if TCP source port is greater than 1023 (Rule 2). In one embodiment, to prevent conflicts within the same ACL, the rules are arranged in a hierarchy, usually based on the order the rules are listed in the ACL. Thus, the identified action may change based on the ordering of the rules in the hierarchy.

Continuing the previous example, assume Rule 1 is higher in the hierarchy than Rule 2. If the networking element receives a data frame with a header that contains an IP source address of 9.10.000.1 and a TCP source port of 1024, only the condition associated with Rule 1 (i.e., forwarding the packet) is performed even though the frame technically also satisfies the condition associated with Rule 2. This organization enables the ACL to have multiple rules yet manage any potential conflicts that may arise. In one embodiment, the ACL may be thought of as a list of rules that are parsed in a top down manner where the contents of a received frame are compared to the conditions in the rules. The first rule having a condition that is satisfied by the frame header is selected. Even if other rules in the ACL have conditions satisfied by the header, those rules as well as their corresponding actions, are neither selected nor performed. Moreover, although the embodiments herein disclose comparing the conditions to the contents of data frames, in other embodiments, any type of network traffic may be evaluated against the condition (e.g., data packets, segments, and the like).

At least in some embodiments, each rule in an ACL may have a plurality of actions that correspond to a single condition—i.e., instead of a single action corresponding to the single condition. This plurality of actions is referred to herein as an action set. When a condition of a rule is satisfied, the ACL may return a plurality of actions to be performed by the networking element—i.e., instead of returning only the single action. In one embodiment, the action set may be further divided into different action types (e.g., a forwarding action, copying to a control point, altering a portion of the frame header, and the like) where each rule in the ACL defines a specific action to perform for each action type. Accordingly, whichever condition is satisfied first, all the actions established by that the action set of the rule specifying the condition are performed by the networking element. Depending on the embodiment, two rules within the same ACL may have the same action set or may have different actions for one or more of the action types in the action set.

As shown, the memory system 100 of the networking element includes a ternary content-addressable memory (TCAM) 105, condition selection logic 110, and a memory element 115 for establishing one or more ACLs. A content-addressable memory (CAM) is associative memory (or associative storage) that receives a data word and searches its entire memory to see if that data word is stored anywhere in the memory. If the data word is found, the CAM returns data identifying one or more storage addresses where the word is found. A binary content-addressable memory uses data search words consisting entirely of 1s and 0s; however, the TCAM 105 allows a third matching state of "don't care" ("X"). Thus, if the data word to be searched is "10010" and if the TCAM 105 stores conditions "1001X" and "1X010" in respective rows, the TCAM 105 returns data indentifying the address of these rows—i.e., the conditions are satisfied by the received data word.

The memory system 100 uses the TCAM 105 to store the conditions of an ACL. As shown by an arrow 120, the networking element uses information in a received data frame to search the TCAM 105, which compares, in parallel, the frame information to each condition (i.e., conditions 1-N+4) stored in the rows of the TCAM 105. In this embodiment, the TCAM 105 indicates which conditions are satisfied by the received frame using a bit vector 125. Because each bit of the bit vector 125 corresponds to a row of the TCAM 105 that contains a condition for the ACL, the number of bits in the bit vector 125 depends on the number of conditions or rules in the ACL. The bit vector 125 may use a logical "1" to indicate that the frame information satisfied the condition and a logical "0" if it did not. For example, if the frame header contains an IP source address that satisfies conditions 1 and 3 and a TCP source port that satisfies condition 9, the bit vector 125 returned by the TCAM 105 is "1010000010 . . . " where the leftmost bit corresponds to the topmost row of the TCAM 105.

In one embodiment, the conditions stored in the TCAM 105 are made using a pattern and mask. For example, the pattern may be "9.00.000.0", and the mask may be "255.000.00.0". The portion "255" (i.e., the highest possible bit value for that portion of the pattern) indicates that this portion of the pattern is to be matched precisely. Conversely, the portion of zeros (i.e., the lowest possible bit value for that portion of the pattern) indicate that these portions of the pattern are "don't care" bits. Thus, the resulting logic is "9.*.*.*". Using a pattern and mask, the TCAM 105 can be programmed to determine whether different portions of a received frame match a condition in the TCAM 105.

As discussed above, in one embodiment, the rules of an ACL are arranged in the form of a hierarchy. Although TCAM 105 enables all conditions to be compared to the frame information simultaneously (which speeds up the ACL lookup relative to parsing each condition individually) the returned bit vector 125 indicates all the conditions that are satisfied, regardless of the established hierarchy. Accordingly, the system 100 includes condition selection logic 110 that parses through the bit vector 125 to find the first bit with a value that indicates the condition was satisfied. In the example bit vector provided above, the condition selection logic 110 would parse the bit vector "1010000010" from left to right and stop at the first logical "1". The index of the vector—in this case, index [0]—is then used as the memory address to identify the action set corresponding to the satisfied condition. Stated differently, the index of the bit vector indicates the highest-priority rule with a condition satisfied by the received frame. In one embodiment, the condition selection logic 110 may be hardware (i.e., logic circuitry), firmware, software, or some combination thereof within the networking element.

In one embodiment, the index identified by the condition selection logic 110 is then used by the networking element to indentify a particular row in the memory element 115 that stores the actions sets of the ACL. As represented by arrow 130, the networking element then performs the various actions defined in the action set returned by searching the memory element 115. In this manner, the condition stored in the TCAM 105 and the action set stored in the memory element 115 are combined to yield a plurality of rules 135 for each ACL. Moreover, the TCAM 105 and memory element 115 may be logically divided to store multiple ACLs for the networking element in the same memory structures. For example, ten entries of the TCAM 105 and memory element 115 may be used to store a first ACL while another ten entries are assigned to a second ACL.

Because a particular memory address (i.e., the index of the bit vector 125 with the highest priority condition) is already identified, instead of being a special type of storage element like a CAM, the memory element 115 may be implemented by any memory type such as SRAM, DRAM, Flash memory, or other volatile or non-volatile memory elements. As shown, the TCAM 105 stores the conditions while the memory element 115 stores the actions sets. However, this embodiment is for illustration purposes only; for example, the memory element 115 may be further divided into different physical memory elements that each stores only a portion of the action set. Moreover, the TCAM 105 and condition selection logic 110 may be replaced by random access memory or other logic in embodiments where the parallel comparisons performed by the TCAM 105 is not needed (e.g., where time is not a critical factor).

Figure 2:
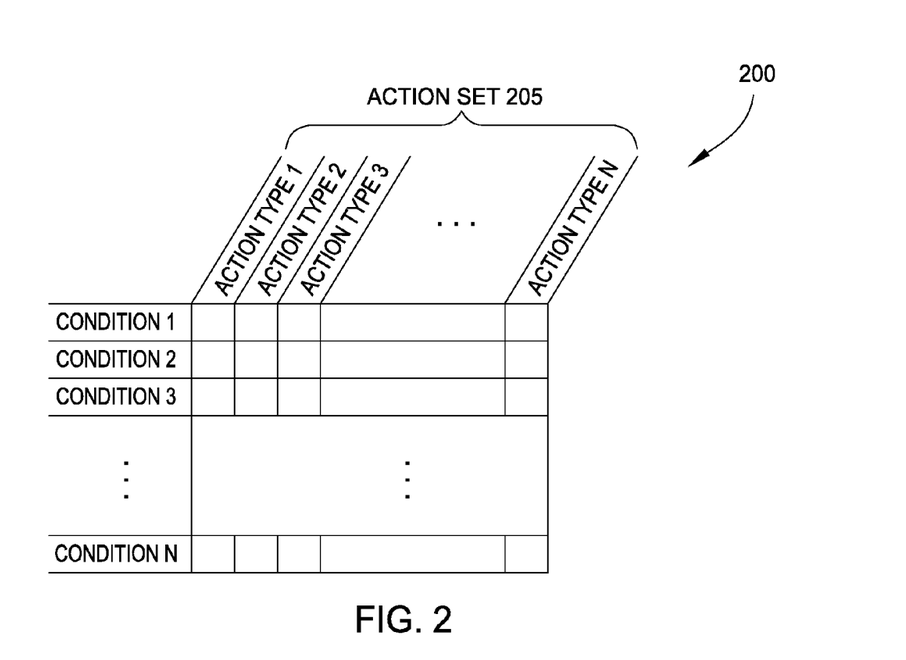
FIG. 2 is a chart that matches a satisfied condition with an action set, according to one embodiment described herein.

FIG. 2 is a chart 200 that matches a satisfied condition with an action set, according to one embodiment described herein. The chart 200 is organized to include a plurality of conditions along the X-axis and a plurality of action types along the Y-axis. The action types 1-N make up an action set 205 where each condition corresponds to exactly one action set 205. Specifically, chart 200 may represent the organization of data in the memory element 115 shown in FIG. 1 where the conditions in the X-axis may be represented by the vector index transmitted by the condition selection logic 110. That is, index[0] represent Condition 1, index[1] represents Condition 2, and so forth. Thus, based on the vector index, the chart 200 identifies the different actions associated with the action types. For example, assume action type 1 identifies the forwarding action the networking element should perform with the received data frame. For Condition 1, the action for action type 1 may be to drop the frame (or its corresponding packet), Condition 2 may instruct the networking element to forward the frame according to the destination in the frame's header, and Condition 3 may instruct the networking element to forward the frame to a specified destination regardless of its intended destination. In one embodiment, the ACL rules (i.e., the conditions and action sets 205) are provided by a user, such as an administrator. That is, the networking element may include functionality that permits the administrator to configure the ACL by adding or subtracting rules or changing existing ones.

Figure 3:
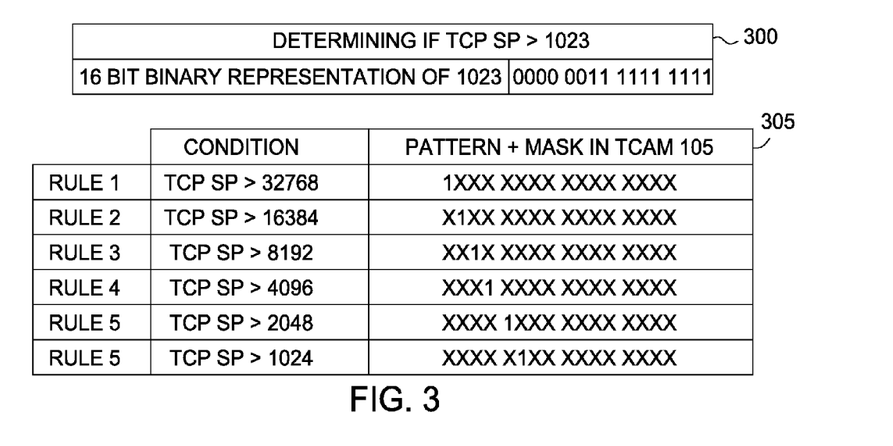
FIG. 3 illustrates the number of TCAM entries needed for one logical comparison, according to one embodiment described herein.

FIG. 3 illustrates the number of TCAM entries needed for one logical comparison, according to one embodiment described herein. Chart 300 illustrates the 16-bit binary representation of 1023 which is used to establish a logical comparison for TCAM. In TCP/IP, the frame header designates a 16-bit portion for identifying the TCP source port (SP). A common rule in an ACL is performing a particular action (e.g., discarding the packet) if the TCP SP for an incoming frame is greater than 1023. However, while TCAMs provide the advantage of evaluating each stored condition in parallel, a TCAM may be unable to do certain actions (e.g., determining if a received value is within a certain range) using only a single rule—i.e., a single entry or row in the TCAM.

Chart 305 illustrates the number of rules or entries needed in a TCAM to determine if a received TCP SP is greater than 1023. As shown, the ACL needs six different rules (i.e., six different entries in the TCAM) to perform the logical comparison of TCP SP>1023. Specifically, the TCAM has one condition (Rule 1) that determines if the received TCP SP is greater than 32,768 as shown by the pattern+mask entry in the right hand column of chart 305. Rule 2 checks to see if the received TCP SP is greater than 16,384, and so forth. If any of Rules 1-6 are satisfied, than the action is performed—e.g., the frame is dropped or re-routed. That is, Rules 1-6 may have the same action set, but the ACL uses six different conditions to ensure the logical comparison of TCP SP>1023 is satisfied.

Moreover, in some embodiments, the system administrator may want to perform a particular action if the TCP SP is greater than 1023 and if the TCP destination port (DP) is also greater than 1023. As can be extrapolated from chart 305, determining whether a received TCP DP port is greater than 1023 also requires using six different entries in the TCAM 105. However, to perform the logical comparisons of TCP SP>1023 and TCP DP>1023, the TCAM 105 needs 36 entries—one entry for each possible combination of the six respective entries of the two conditions (6*6). For example, one TCAM entry would include the pattern+mask for Rule 1 of TCP SP as well as a pattern+mask for one of the rules associated with TCP DP. The TCAM compares both the received TCP SP and the TCP DP to each of the 36 entries to see if the above logical comparison is satisfied. Thus, adding conditions to a logical comparison may disproportionately increase the number of entries required in the TCAM—i.e., even though the logical comparison is only doubled in size, the number of entries increases exponentially. However, this example is for illustration purposes only and does not limit the scope of the present disclosure. The embodiments disclosed herein may advantageously be used to minimize the number of entries used in the TCAM when performing any type of logical comparison.

In some embodiments, to avoid using multiple entries in the TCAM to perform one or more logic comparisons, the networking element may include a special-case hardware system for performing certain selected logic comparisons. That is, instead of using entries in the TCAM 105 to determine if the received frame satisfies a condition, a separate hardware unit determines if the condition established by the logic comparison is satisfied and returns the result to the TCAM.

Figure 4A:
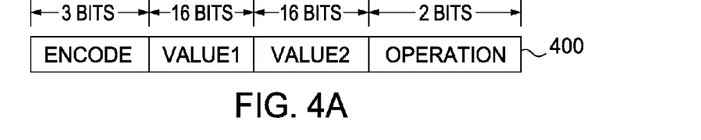
FIG. 4A illustrates a special-case instruction for performing a logical comparison, according to one embodiment described herein.

FIG. 4A illustrates a special-case instruction 400 for performing a logical comparison, according to one embodiment described herein. The instruction 400 is a 37-bit data word that may be stored in a register in the networking element. As shown, the instruction 400 is logically divided into four different bit portions or fields: encode, value1, value2, and operation. In one embodiment, a system administrator provides the instruction 400 to the networking element, which uses the instruction 400 to configure a particular hardware system in the network element. Although shown as a contiguous word, the different fields of the instruction 400 may be stored in separate registers in the networking element.

Figure 4B:
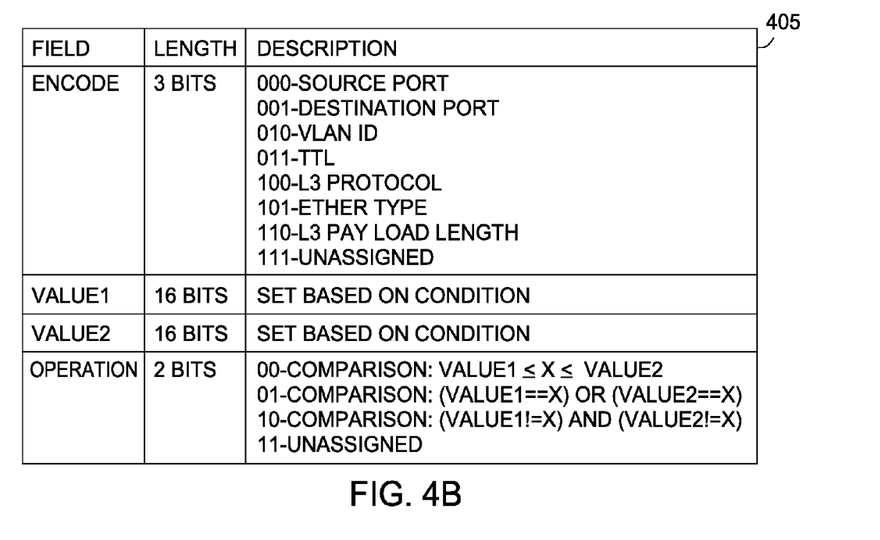
FIG. 4B is a chart describing the different portions of the special-case instruction shown in FIG. 4A, according to one embodiment described herein.

FIG. 4B is a chart 405 describing the different portions of the special-case instruction 400 shown in FIG. 4A, according to one embodiment described herein. Stated differently, the chart 405 illustrates the different functionalities of the special-case hardware system included within the network device. A system administrator uses the functionalities illustrated in chart 405 to generate special-case instructions 400 to configure the hardware system to test for a particular condition based on incoming network traffic.

In the embodiment shown in FIG. 4B, the encode field is three bits long where each bit combination is associated with a particular portion of an Ethernet frame header—e.g., the source port, destination port, VLAN ID, TTL, L3 Protocol, EtherType, and L3 Payload length. Accordingly, if the system administrator wants the hardware system to evaluate a VLAN ID value of a received Ethernet frame, the encode field of the instruction 400 is set to "010".

In one embodiment, the system administrator sets the value1 and value2 fields in the instruction 400 based on the desired condition of the logical comparison. In one embodiment, the lengths of the value1 and value2 fields are set based on the largest possible value of the different encode operations. For the encode fields shown in chart 405, the largest length is the source and destination ports, which are 16-bit portions. If, for example, the encode field was expanded to allow the instruction 400 to map to an IP address (a 32-bit data word), the value1 and value2 fields may both be increased to 32 bits.

Figure 6:
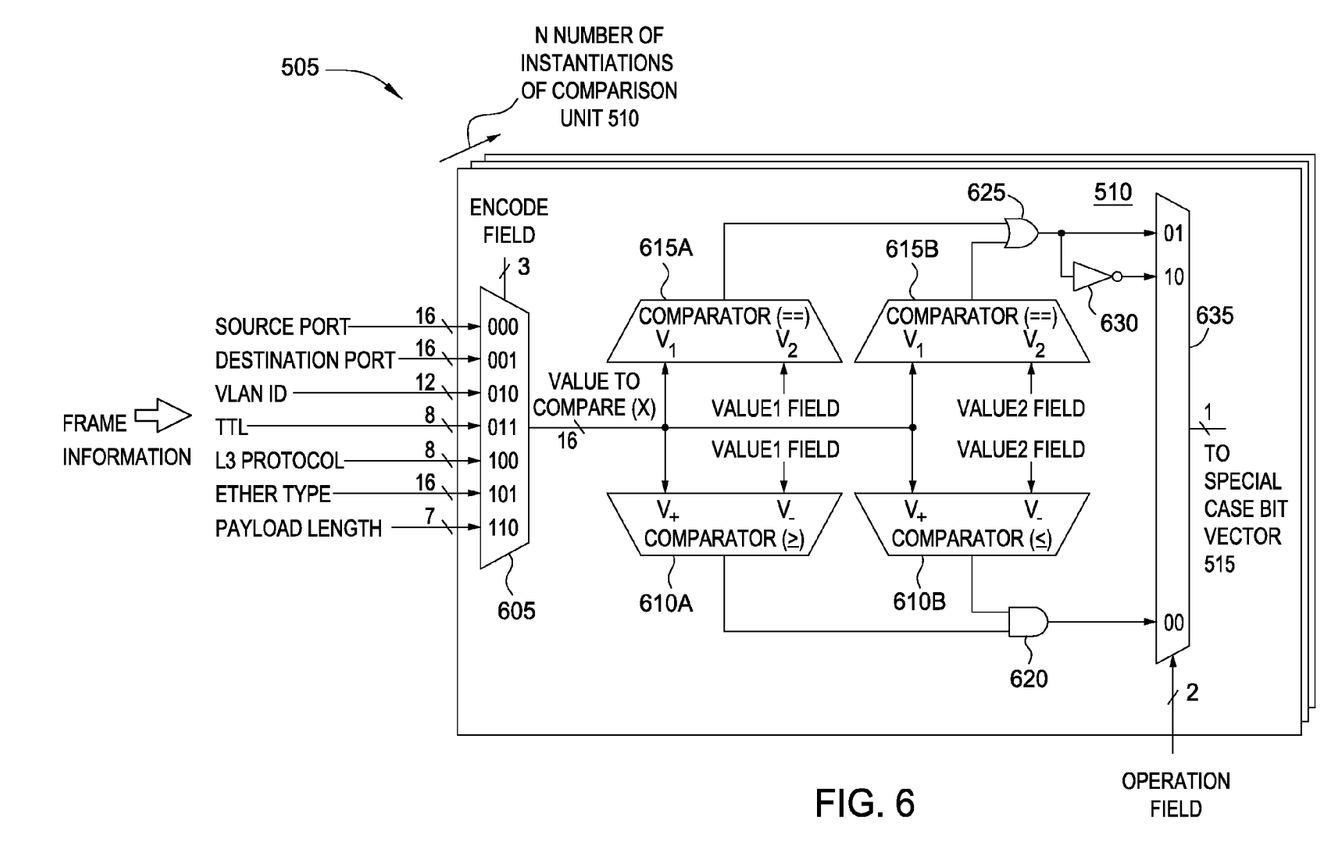
FIG. 6 illustrates a hardware diagram of a comparison unit shown in FIG. 5, according to one embodiment described herein.

In one embodiment, the operation field is a 2-bit portion of the instruction 400 that instructs the hardware system to perform a particular comparison. In this embodiment, the hardware system is configured to perform at least three operations using a received value (X) corresponding to the encode field: Value1≤X≤Value2, Value1==X OR Value2==X, and Value1!=X AND Value2!=X, where OR and AND are logical operators. Based on this field, the special-case instruction 400 directs the hardware system to compare a portion of the received frame to the value1 and value2 fields provided in the instruction 400. For example, to configure a hardware system to perform the logic comparison TCP SP>1023, an administrator generates a special-case instruction with the encode field set to "000" to correspond to the source port of the received frame, the value1 field set to the bit representation of $2^{16}-1$, the value2 field set to the bit representation of 1024 (i.e., $2^{10}$), and the operation field set to "00". Once the instruction is received, the hardware system extracts the source port field from incoming Ethernet frames and determines whether that value (X) is between the value1 and value2. If so, the hardware system may output a logical "1", but if not, the system may output a logical "0". In another example, assume that the system administrator wants to perform a certain action if either a received frame is either a TCP L3 Protocol type or UDP L3 Protocol type. Instead of using the TCAM to see if the L3 Protocol of a received frame is one of these types, the system administrator may generate a special-case instruction 400 where the encode field is set to "100" to correspond to the L3 Protocol, the value1 field is set to the binary representation of 6 (the TCP protocol number), the value2 field is set to the binary representation of 17 (the UDP protocol number), and the operation field is set to "01" (i.e., test to see if Value1==X OR Value2==X). This instruction 400 configures the hardware system to determine if the L3 Protocol portion of a received frame header is either a 6 or a 17. So long as the received L3 Protocol is one of these numbers, the hardware system may output a logical "1". A detailed example of a hardware system corresponding to chart 405 is shown in FIG. 6.

The embodiment shown in chart 405 is for illustration purposes only and may be reconfigured in various manners to achieve different goals. For example, other embodiments may require the addition of different operations such as evaluating different portions of an Ethernet frame header (e.g., the IP source address) which may change the length of the different fields. Furthermore, if the encode field maps only to four different fields of an Ethernet frame header, the length of the encode field may be reduced to only two bits but the value1 and value2 fields may be increased to 32 bits. In another example, the hardware system corresponding to the chart 405 may be increased to perform additional operations than the ones shown, or operations may be removed (e.g., the hardware system is configured to perform only the first operation).

Figure 5:
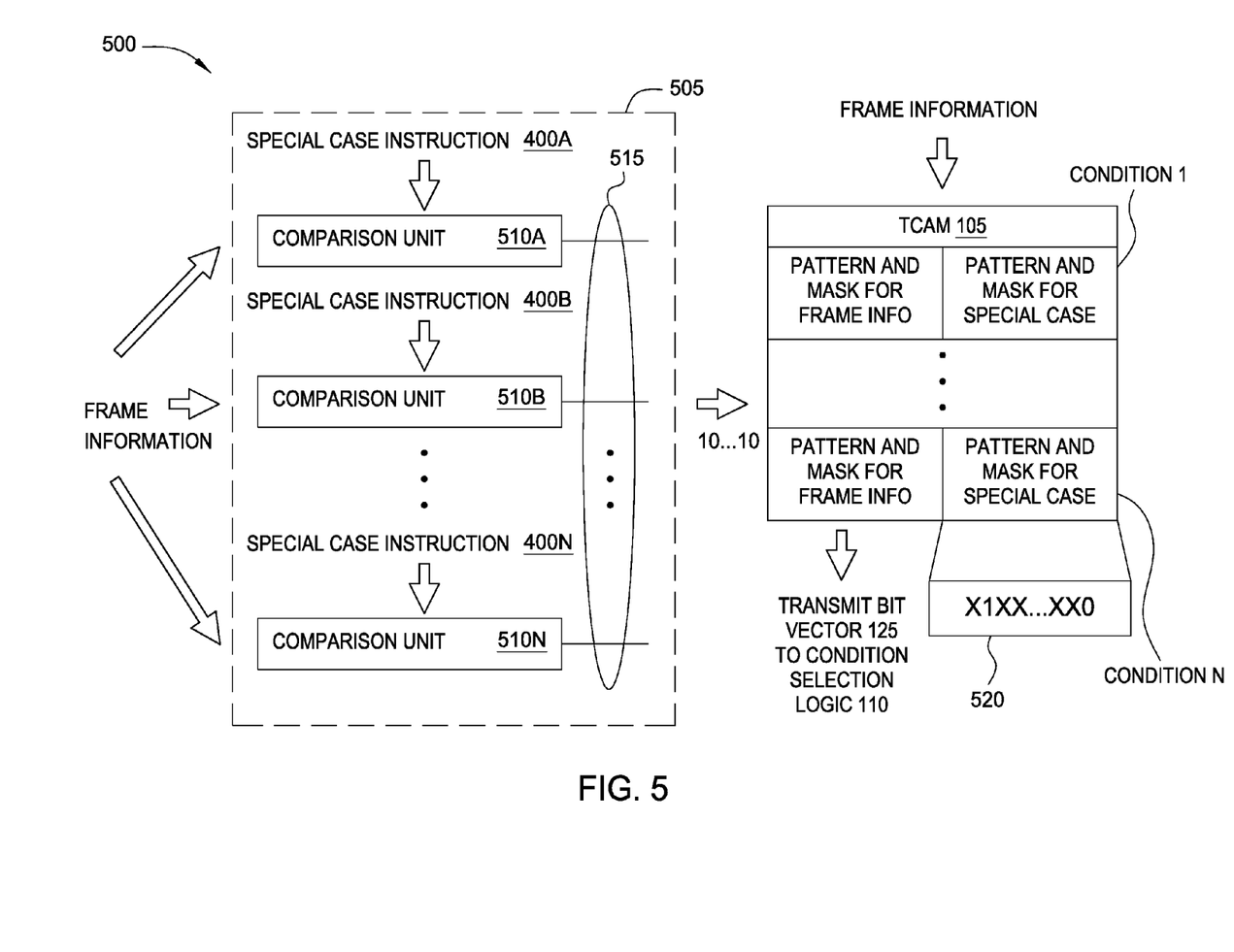
FIG. 5 is a block diagram of a system for evaluating special-case instructions used in an ACL, according to one embodiment described herein.

FIG. 5 is a block diagram of a system 500 for evaluating special-case instructions 400A-N used in an ACL, according to one embodiment described herein. System 500 includes a special-case hardware system 505 and a TCAM 105, which uses the output of the hardware system 505 to determine where a condition is satisfied. The hardware system 505 includes a plurality of comparison units 510A-N that each correspond to a special-case instruction 400. In one embodiment, the system administrator may generate the multiple instructions 400A-N which configure the different comparison units 510 in the hardware system 505 to check specific conditions. For example, special-case instruction 400A may configure comparison unit 510A to determine whether the received frame has a TCP SP value greater than 1023 while special-case instruction 400B configures comparison unit 510B to determine whether the L3 Protocol for the received frame is either 6 or 17. The special-case instructions 400A-N may be stored as separate entries in a register in the network element. Accordingly, the system administrator may access this register to add new instructions 400 or replace, modify, or remove the current instructions 400. In one embodiment, the networking element may only have as many special-case instructions 400 as there are comparison units 510—e.g., if there are 32 comparison units then there are 32 entries for the register storing the instructions 400. However, there may be fewer instructions 400 than comparison units, which would result in some comparison units 510 remaining unused.

Each comparison unit 510 evaluates some portion of the received frame information, determines whether the portion satisfies the condition established by corresponding special-case instruction 400, and outputs a logic bit indicating whether the condition is satisfied. The hardware system 505 combines the logic bits from the comparison units 510 to generate a bit vector 515. The length of the bit vector 515 depends on the number of comparison units 510 in the hardware system 505. Moreover, if a comparison unit 510 is currently not configured by to perform a special-case instruction 400, the unit 510 may default to always transmitting a logical 0.

The results of the comparison units 510A-N, i.e., the bit vector 515, is used as one input into the TCAM 105. As shown here, the TCAM 105 has two inputs: bit vector 515 and the frame information. In one embodiment, the frame information received at the TCAM 105 is the same frame information received at the hardware system 505—e.g., the same received frame header is routed within the networking element to both the hardware system 505 and the TCAM 105. The entries in the TCAM 105 are divided into a pattern and mask for the received frame information (e.g., a first sub-entry) and the pattern and mask for the result of performing the special-case instructions 400A-N (e.g., a second sub-entry). As discussed with regards to FIG. 1, the TCAM 105 uses the pattern and mask to store conditions that are compared with incoming frame information to determine if the conditions are satisfied—e.g., the pattern and mask condition "9.*.*.*" is compared to the IP source address found in a received frame header. In addition, each entry or row of the TCAM 105 may include a pattern and mask to determine whether one of the special-case instructions 400 was satisfied by the received frame. For example, assume that special-case instruction 400A configured comparison unit 510A to determine whether the TCP SP of a received frame is greater than 1023. If a rule in the ACL instructed the networking element to discard all frames satisfying this condition, the TCAM 105 includes a pattern and mask that determines whether the comparison unit 510A outputs a logical 1. If there are four comparison units 510, the bit pattern stored in TCAM 105 may be "1XXX" where the logical 1 corresponds to the output of comparison unit 510A in the bit vector 515. Thus, any time the TCAM 105 receives a bit vector 515 where the first bit is a logical 1, the TCAM 105 knows that the condition of TCP SP>1023 is satisfied by the received frame.

The system administrator may also configure TCAM 105 to determine if more than one of the special-case instructions 400 is satisfied. Entry 520 of TCAM 105 illustrates an example pattern and mask for determining if two special-case instructions 400 are satisfied by the incoming frame. In this case, the TCAM 105 determines whether comparison unit 515B returns a logical 1 and comparison unit 515N returns a logical 0 (i.e., the condition is not satisfied). For example, the rule of the ACL may want to perform an action if the TCP DP is greater than 512 and the L3 payload length is less than four. Because comparison unit 510N may be configured to determine whether the L3 payload length is four or greater, if unit 510N returns a zero, than the payload length is less than four and the condition is satisfied. In this manner, the conditions set in the TCAM 105 for the different comparison units may combine (or chain) the outputs of the comparison units 510A-N and detect either logical 1's or 0's to determine if multiple comparison units satisfy a given condition.

Moreover, in one embodiment, the TCAM 105 shown in FIG. 5 can further combine the pattern and mask for special cases and a pattern and mask for the received frame information. That is, the entries in the TCAM 105 may be wide enough that a system administrator can use the patterns and masks in conjunction to perform rules with more complex conditions. For example, the system administrator may configure a single TCAM 105 entry to check whether a received IP address satisfies "9.*.*.*" using the pattern and mask for frame information and to check whether TCP SP is greater than 1023 using the pattern and mask for special cases. In ACL rules where one of the patterns and masks is not needed, the irrelevant portion of the entry may simply be filled with don't cares. In another embodiment, the width of the TCAM entries may too small to accommodate placing both types of conditions into a single entry. Accordingly, in one embodiment, the system 500 TCAM 105 include a flag bit or register that indicates whether the received frame information or the bit vector 515 from the comparison units 510 should be compared to the entry.

If the bit vector 515 indicates that a rule's condition is satisfied, the TCAM 105 updates the bit vector 125 accordingly and transmits the information to the condition selection logic 110 for further processing as discussed in regards to FIG. 1. Advantageously, using a pattern and mask for the special cases may reduce the number of entries needed in the TCAM 105. For example, instead of using six entries in the TCAM 105 for checking whether TCP SP is greater than 1023, this check requires only one entry. Moreover, instead of using 36 entries for determining whether both TCP SP and DP are greater than 1023, still only one entry in the TCAM 105 is required (assuming respective comparison units 510 are configured to perform these two special cases). For example, the system administrator may design a pattern and mask that is satisfied only if the bit vector 515 includes logical 1's corresponding to the two comparison units 510 configured to check whether TCP SP>1023 and TCP DP>1023. Thus, by adding the comparison units to the networking element, the TCAM 105 may be used more efficiently, which may help to minimize the size of the TCAM 105 or maximize the number of rules that an ACL may contain.

FIG. 6 illustrates a hardware diagram of a comparison unit 510 shown in FIG. 5, according to one embodiment described herein. The hardware system 505 includes a plurality of comparison units 510 that each includes hardware elements for performing the operations shown in the operation field of chart 405 in FIG. 4B. Each comparison unit 510 may receive the same frame information which may include different network fields stored in an Ethernet frame header such as source port, destination port, VLAN ID, and the like. The encode field of the special-case instruction is used to select one of these different header fields using the multiplexer (mux) 605. Even though the different header fields are of varying bit lengths, the output of mux 605 is designed to satisfy the largest bit length—i.e., 16 bits. If a encode field selects a header field less than 16 bits, the unused portion of the output may be backfilled by zeros. As such, the output of the mux 605 is the value (X) that is compared against the value1 and value2 fields set in the special-case instruction.

The comparators 610A and 610B compare the value of input V− to the value of input V+. If the value of V+ is greater, the comparators 610A and 610B output a logical 1; else, the outputs are zero. The V− input of comparator 610A is X while the V+ input is value1 of the special-case instruction. The V− input of comparator 610B is value2 of the special-case instruction while the V+ input is X. Comparators 610A and 610B both output logical 1's if Value2≥X≥Value1. If this condition is met, the AND gate transmits a logical 1 to the mux 635.

Comparators 615A and 615B compare the value of input V1 to the value of input V2. If these values are equal, the comparators 615A and 615B output a logical 1; else the outputs are zero. In the comparison units 510, the comparators 615A and 615B compare the received value X to value1 and value2, respectively. If either of the comparators 615A and 615B output a one, the OR gate 625 also outputs a logic one. That is, the OR gate 625 outputs a logical 1 if either X==Value1 or X==Value2. Conversely, the output of the inverter 630 is a logical 1 only if X!=Value1 and X!=Value2—i.e., if the output of the OR gate 625 is a logical 0. In this manner, the outputs of the AND gate 620, the OR gate 625, and the inverter 630 each respectively correspond to a result of performing one of the operations shown in chart 405 of FIG. 4B (i.e., Value2≥X≥Value1, X==Value1 OR X==Value2, and X!=Value1 AND X!=Value2). The mux 635 uses the operation field of the special-case instruction as the selector to signal to select which result to add to the bit vector 515. That is, each comparison unit 515 contributes one bit to the bit vector 515 that is then transmitted to the TCAM (not shown).

Figure 7:
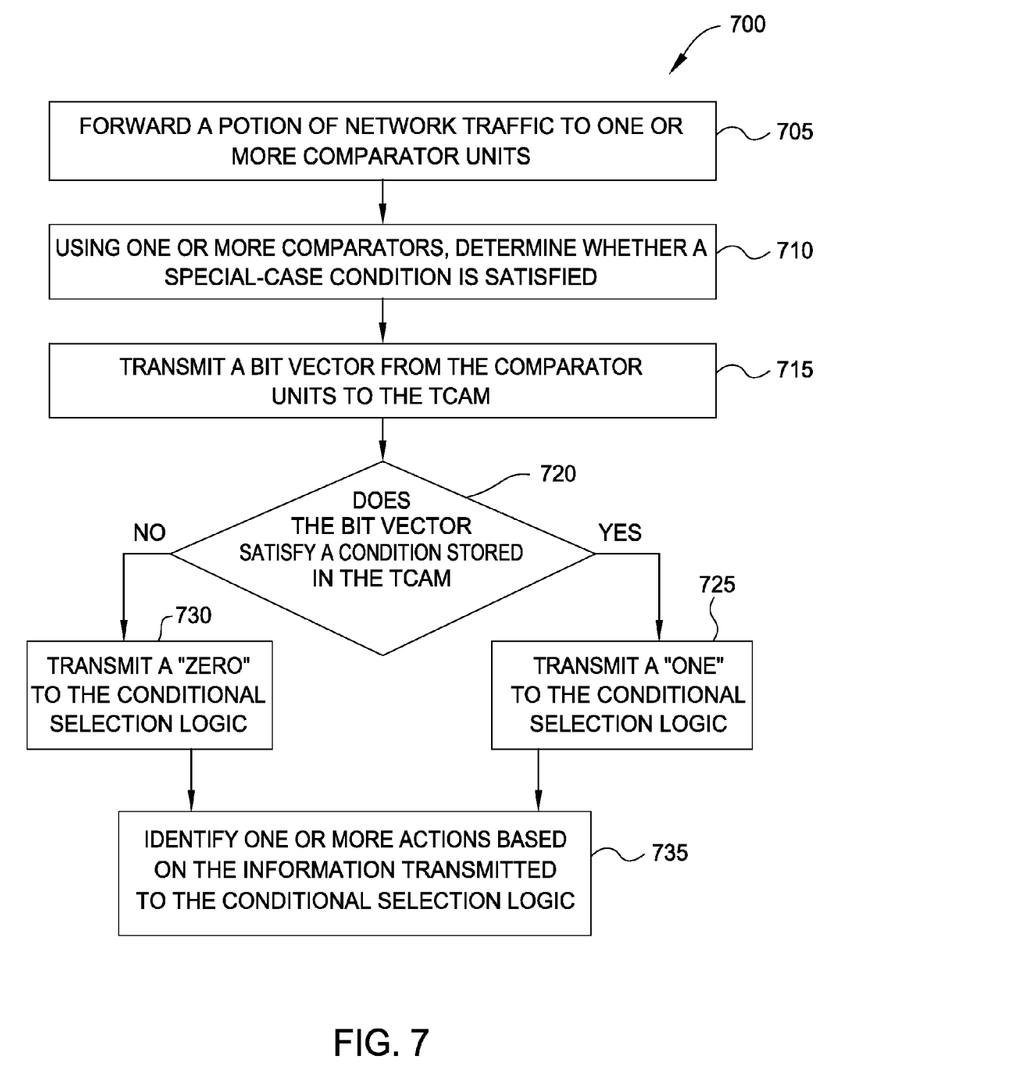
FIG. 7 illustrates a method for evaluating special-case instructions in an ACL, according to one embodiment described herein.

FIG. 7 illustrates a method 700 for evaluating special-case instructions in an ACL, according to one embodiment described herein. Method 700 begins at block 705 when a networking element forwards a portion of network traffic, such a frame header, to one or more comparator units. Like a pattern and mask in the TCAM, the comparator units are configured to evaluate whether the network traffic satisfies a particular condition. In one embodiment, a system administrator updates a register to include one or more special-case instructions that configure respective comparator units to evaluate selected conditions. The system administrator may select conditions that are commonly used when generating rules for an ACL but inefficiently use the TCAM—i.e., the TCAM requires multiple entries to determine if the condition is satisfied. Thus, when generating the ACL that uses one of these common conditions, the system administrator may configure the pattern and mask in the TCAM to take advantage of the comparator units. Alternatively, the system administrator may have a customized condition she wants to include in the ACL but requires too many entries in the TCAM. Instead of testing for this condition using the TCAM, the system administrator may add one or more special-case instructions into the register which then instructs one or more of the comparator units to perform the necessary logic. The administrator may then configure the TCAM to evaluate only the output of the respective comparator units without separately checking to see if the received network portion satisfies the condition.

At block 710, the networking element uses the comparators to determine whether one of the special-case conditions is satisfied. In one embodiment, the comparator units evaluate a portion of network traffic each time the ACL is invoked. Stated differently, each time a portion of network traffic is compared to the conditions in the TCAM, the networking element also transmits the same network traffic portion to the comparator units. In this manner, the comparator units process the network traffic to determine whether the portion satisfies the special-case conditions. At block 715, if the networking element includes multiple comparator units, the respective outputs may be combined to form a bit vector where each bit indicates if the condition tested by the corresponding comparator unit is satisfied by the network traffic portion.

At block 720, the TCAM uses the bit vector received from the comparator units to confirm that a condition was satisfied. The TCAM includes a pattern and mask entry that is compared to the bit vector. In one embodiment, the entries of the TCAM are divided into two different pattern and mask sub-entries: one sub-entry tests the bit vector as described above while the second sub-entry is used to test the network traffic portion directly. The condition is satisfied only if both pattern and mask sub-entries are satisfied by the respective inputs—i.e., the bit vector from the comparator units and the network traffic portion. If the bit vector satisfies the condition (or conditions) stored in the entry, at block 725, the TCAM transmits a logical 1 to the condition selection logic 725, but if not, at block 730, a logical 0 is transmitted instead.

At block 735, the rest of the elements of the ACL (e.g., the condition selection logic and the memory element) use the bit vector produced by the TCAM to select one or more actions for the networking element to perform on the received network traffic. For example, the TCAM may indicate that a plurality of conditions is satisfied based on the network traffic portion. The condition selection logic may select only one of these satisfied conditions and use the location of the selected condition in the bit vector to index into the memory element. The memory element then returns one or more actions (e.g., forwarding the frame, discarding the frame, saving a copy of the frame, etc.) for the networking element to perform.

An Example System

Figure 8:
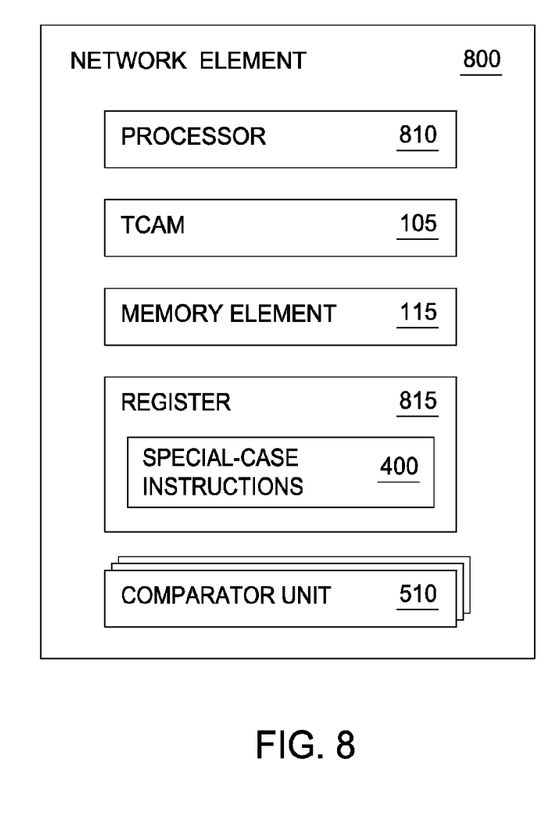
FIG. 8 is a block diagram of a networking element, according to one embodiment described herein.

FIG. 8 is a block diagram of a networking element 800, according to one embodiment described herein. The networking element 800 includes a processor 810, TCAM 105, memory element 115, a register 815, and a comparator unit 510. In one embodiment, the networking element 800 may be an integrated circuit (IC) such that the processor 510, TCAM 105, memory element 115, register 815, and comparator unit 510 are part of a single chip. However, in other embodiments, these components of the networking element 800 may be part of different chips or independent units that are communicatively coupled to form the networking element 800. For example, the components may be mounted on a shared substrate (e.g., PCB) and communicatively coupled by wire traces.

In one embodiment, the processor 810 is any suitable processor for performing the functions described herein. The processor 810 may include a plurality of different processors or a single processor with multiple cores. The TCAM 105, as described above, is an associative memory element that permits a data word to be compared, in parallel, to each entry in its rows. In one embodiment, the TCAM 105 is configured using a pattern and mask technique to contain a condition for each rule in an ACL. The TCAM 105 compares a portion of the incoming network traffic (e.g., a header of a frame), a bit vector received from the comparator units 510, or both to the saved conditions to determine which conditions are satisfied by the network traffic portion. Once a satisfied condition is identified, the networking element 800 may use the memory element 115 to look up the action set corresponding to the satisfied condition. That is, each condition in the TCAM 105 may correspond to a single action set stored in the memory element 115.

To efficiently use the entries in the TCAM 105, the network element 800 includes a register 815 and one or more comparator units 510. The register 815 may be a separate storage element in the networking element 800 or be logical partition within another storage element. A system administrator accesses the register 815 to add, remove, or update the different special-case instructions 400 stored therein. Each special-case instruction 400 corresponds to a comparator unit 510 and configures the unit 510 to test for a particular condition. In one embodiment, instead of using only the TCAM 105 to determine whether a rule's condition is satisfied, the networking element 800 transmits the network traffic portion to the comparator units 510 which compare the portion to values provided by the special-case instructions 400. The results of this comparison may then be passed to the TCAM 105 which, in combination with the memory element 115, identifies one or more actions for the processor 810 to perform on the received network traffic.

In one embodiment, the networking element 800 is used to connect different networks together (e.g., a WAN to a LAN) or to connect an network to a end device such as a server or user computing device and may thus be part of a larger networking device, such as a Ethernet switch, router, bridge, and the like.

CONCLUSION

In embodiments disclosed herein, ACLs permit network administrators to manage network traffic flowing through a networking element to optimize network security, performance, QoS, and the like. For example, the networking element may be an integrated circuit (IC) located within a larger network device—e.g., a router, switch, bridge, etc. ACLs include one or more rules that each define a condition and one or more actions to be performed if the condition is satisfied. In one embodiment, the conditions are stored on a ternary content-addressable memory (TCAM) which receives a portion of network traffic, such as a frame header, and compares different portions of the header to the entries in the TCAM. If the frame header satisfies the condition, the TCAM reports the match to other elements in the ACL which in turn identify an action to perform based on the condition satisfied.

For certain conditions, such as testing whether a received number falls within a certain numerical range, the TCAM may divide the condition into a plurality of sub-conditions which are each stored in a row of the TCAM. As conditions become more complex, more rows of the TCAM may be needed. To efficiently use the limited space in the TCAM, the networking element may include one or more comparator units which check for special-case conditions. The comparator units may be used in lieu of the TCAM to determine whether the condition is satisfied. Thus, instead of directly determining whether the received data satisfies the condition, the TCAM monitors the output of the comparator units. In one embodiment, by using the comparator units, the TCAM needs only one entry to monitor the output of the comparator units instead of using multiple rows to evaluate the received data.

In one embodiment, a system administrator may configure the different comparator units to check for different conditions. For example, one comparator unit may check to see if a TCP source port is greater than 1023 while another comparator unit determines if the received frame is associated with a UDP packet. In one embodiment, the networking element includes a register accessible by the system administrator and storing instructions for configuring the comparator units to perform different functions. The administrator may access the register to add, change, or remove the different instructions, thereby changing the functions of the comparator units associated with the entries in the register.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
evaluating a portion of a received network packet using a plurality of comparator units of a networking element, each of the comparator units comprising one or more hardware units that output a bit based on determining whether the network packet portion satisfies a condition associated with an access control list (ACL), wherein the combined outputs of the plurality of comparator units are represented by a bit vector;
transmitting the bit vector to a content addressable memory (CAM);
upon determining that the bit vector satisfies an entry in the CAM, selecting one or more actions corresponding to the satisfied entry to be performed by the networking element, wherein the one or more actions are part of the ACL, and wherein the one or more hardware units of the comparator unit are separate from the CAM;
storing an instruction in a register, the instruction comprising at least one comparison value and an operation code; and
configuring at least one of the comparator units to compare the comparison value to the network traffic portion based on an operation represented by the operation code.

2. The method of claim 1, wherein the ACL comprises a plurality of rules for determining a set of actions to be performed by the networking element, one of the rules comprising the condition and the one or more actions.

3. The method of claim 1, further comprising:
comparing the network packet portion to a first sub-entry stored in the entry of the CAM; and
comparing the result to a second sub-entry stored in the entry of the CAM, wherein the entry is satisfied only if the network packet portion satisfies the first sub-entry in the entry and the result satisfies the second sub-entry in the entry.

4. The method of claim 1, wherein the comparison value and the operation code are stored before one of the comparator units evaluates the network packet portion.

5. The method of claim 1, wherein the CAM is a ternary content addressable memory (TCAM) and wherein the one or more hardware units are comparators.

6. The method of claim 1, wherein the condition evaluated in at least one of the comparator units is not directly evaluated by the CAM.

7. The method of claim 1, wherein the method reduces a count of ACL rules required to express a range comparison operation for the networking element, wherein entries in the CAM are composed according to a predefined format, such that each entry in the CAM specifies: (i) a predefined comparison code; (ii) a predefined operation code; and (iii) a plurality of predefined sub-entries including a first predefined sub-entry and a second predefined sub-entry; wherein the range comparison operation is expressed using a single ACL rule in conjunction with the CAM, rather than using a plurality of ACL rules within the CAM, such that the count of ACL rules is reduced.

8. The method of claim 7, further comprising:
evaluating respective portions of received network packets using the plurality of comparator units of the networking element; and
comparing the bit vector to each entry in the CAM,
wherein the ACL comprises a plurality of rules for determining a set of actions to be performed by the networking element, one of the rules comprising the condition and the one or more actions, wherein the CAM is a ternary content addressable memory (TCAM) and wherein the one or more hardware units are comparators, wherein the condition evaluated in at least one of the comparator units is not directly evaluated by the CAM.

* * * * *